United States Patent
Hebert et al.

(10) Patent No.: US 9,171,066 B2
(45) Date of Patent: Oct. 27, 2015

(54) DISTRIBUTED NATURAL LANGUAGE UNDERSTANDING AND PROCESSING USING LOCAL DATA SOURCES

(71) Applicant: Nuance Communications, Inc., Burlington, MA (US)

(72) Inventors: Matthieu Hebert, Melocheville (CA); Jean-Philippe Robichaud, Mercier (CA); Christopher M. Parisien, Montreal-Ouest (CA)

(73) Assignee: Nuance Communications, Inc., Burlington, MA (US)

( * ) Notice: Subject to any disclaimer, the term of this patent is extended or adjusted under 35 U.S.C. 154(b) by 271 days.

(21) Appl. No.: 13/674,191

(22) Filed: Nov. 12, 2012

(65) Prior Publication Data
US 2014/0136183 A1    May 15, 2014

(51) Int. Cl.
G10L 15/08    (2006.01)
G10L 15/22    (2006.01)
G10L 15/30    (2013.01)
G06F 17/30    (2006.01)

(52) U.S. Cl.
CPC ........... *G06F 17/30654* (2013.01); *G10L 15/30* (2013.01); *G10L 2015/085* (2013.01); *G10L 2015/228* (2013.01)

(58) Field of Classification Search
CPC ......... G10L 15/88; G10L 15/22; G10L 15/30; G10L 25/54; G10L 2015/085; G10L 2015/228
USPC ............................ 704/9, 257, 270.1, E15.047
See application file for complete search history.

(56) References Cited

U.S. PATENT DOCUMENTS

| | | | |
|---|---|---|---|
| 2003/0182113 A1* | 9/2003 | Huang | 704/231 |
| 2005/0210061 A1 | 9/2005 | Chang et al. | |
| 2006/0009980 A1 | 1/2006 | Burke et al. | |
| 2006/0235684 A1* | 10/2006 | Chang | 704/233 |
| 2010/0057450 A1* | 3/2010 | Koll | 704/231 |
| 2010/0324899 A1* | 12/2010 | Yamabana | 704/251 |
| 2011/0015928 A1* | 1/2011 | Odell et al. | 704/257 |
| 2011/0231182 A1 | 9/2011 | Weider et al. | |
| 2012/0069131 A1* | 3/2012 | Abelow | 348/14.01 |
| 2012/0179463 A1* | 7/2012 | Newman et al. | 704/231 |
| 2012/0179471 A1* | 7/2012 | Newman et al. | 704/270.1 |

(Continued)

OTHER PUBLICATIONS

Bai, et al. "Intelligent Retrieval of dynamic networked information from mobile terminals using spoken natural language queries." Consumer Electronics, IEEE Transactions on 44.1, Feb. 1998, pp. 62-72.*

(Continued)

*Primary Examiner* — James Wozniak
(74) *Attorney, Agent, or Firm* — Banner & Witcoff, Ltd.

(57) ABSTRACT

An arrangement and corresponding method are described for distributed natural language processing. A set of local data sources is stored on a mobile device. A local natural language understanding (NLU) match module on the mobile device performs natural language processing of a natural language input with respect to the local data sources to determine one or more local interpretation candidates. A local NLU ranking module on the mobile device processes the local interpretation candidates and one or more remote interpretation candidates from a remote NLU server to determine a final output interpretation corresponding to the natural language input.

18 Claims, 3 Drawing Sheets

(56) References Cited

U.S. PATENT DOCUMENTS

2012/0215531 A1* 8/2012 Grobauer et al. ............. 704/231
2013/0060571 A1* 3/2013 Soemo et al. ................. 704/251
2013/0332164 A1* 12/2013 Nalk ............................ 704/243

OTHER PUBLICATIONS

International Search Report and Written Opinion off International Application No. PCT/US13/68921, mailed May 7, 2014.

* cited by examiner

DISTRIBUTED NATURAL LANGUAGE UNDERSTANDING AND PROCESSING USING LOCAL DATA SOURCES

TECHNICAL FIELD

The present invention relates to a distributed client-server arrangement for natural language processing.

BACKGROUND ART

Natural Language Processing (NLP) and Natural Language Understanding (NLU) involve using computer processing to extract meaningful information from natural language inputs such as human generated speech and text. One recent application of such technology is processing speech and/or text queries in mobile devices such as smartphones.

FIG. 1 shows some example screen shots of one such mobile device application, Dragon Go!, which processes speech query inputs and obtains simultaneous search results from a variety of top web sites and content sources. Such applications require adding a natural language understanding component to an existing web search algorithm in order to extract semantic meaning from the input queries. This can involve using approximate string matching to discover semantic template structures. One or more semantic meanings can be assigned to each semantic template. Parsing rules and classifier training samples can be generated and used to train NLU models that determine query interpretations (sometimes referred to as query intents).

Complex NLU applications for mobile devices such as Dragon Go! are implemented using a client-server architecture where the NLU processing is done solely at the remote server. But there can be a substantial amount of relevant data stored on the local mobile device that needs to be uploaded to the remote NLU processor to optimize the NLU results; for example, lists of meetings (title, content, attendees), contacts, song lists, etc. This data transfer of this data that could be leveraged by the server-side NLU can be problematic for a variety of reasons including confidentiality concerns and the sheer amount of data needed to be uploaded and kept in-sync.

SUMMARY

Embodiments of the present invention are directed to an arrangement and corresponding method for distributed natural language processing. A set of local data sources is stored on a mobile device. A local natural language understanding (NLU) match module on the mobile device performs natural language processing of a natural language input with respect to the local data sources to determine one or more local interpretation candidates. A local NLU ranking module on the mobile device processes the local interpretation candidates and one or more remote interpretation candidates from a remote NLU server to determine a final output interpretation corresponding to the natural language input.

The NLU ranking module may use a fuzzy match algorithm to determine the final output interpretation and/or rank the interpretation candidates in an N-Best list. The NLU ranking module may further process remote interpretation candidates identified as related to information represented in the local data sources before determining the final output interpretation. For example, the NLU ranking module may further use additional supplemental remote interpretation data from the remote NLU server together with data from the local data sources to determine the final output interpretation.

The mobile device may forward natural language processing results of the NLU match module to the remote NLU server for developing the remote interpretation candidates. And the local NLU ranking module may further consider ranking data from the remote NLU server to determine the final output interpretation.

DETAILED DESCRIPTION

Embodiments of the present invention are directed to a distributed client-server arrangement for NLU processing that leverages on-device data to do some of the processing locally on the mobile device, and some of the processing remotely on the server using the data and resources available to it.

Figure 1:
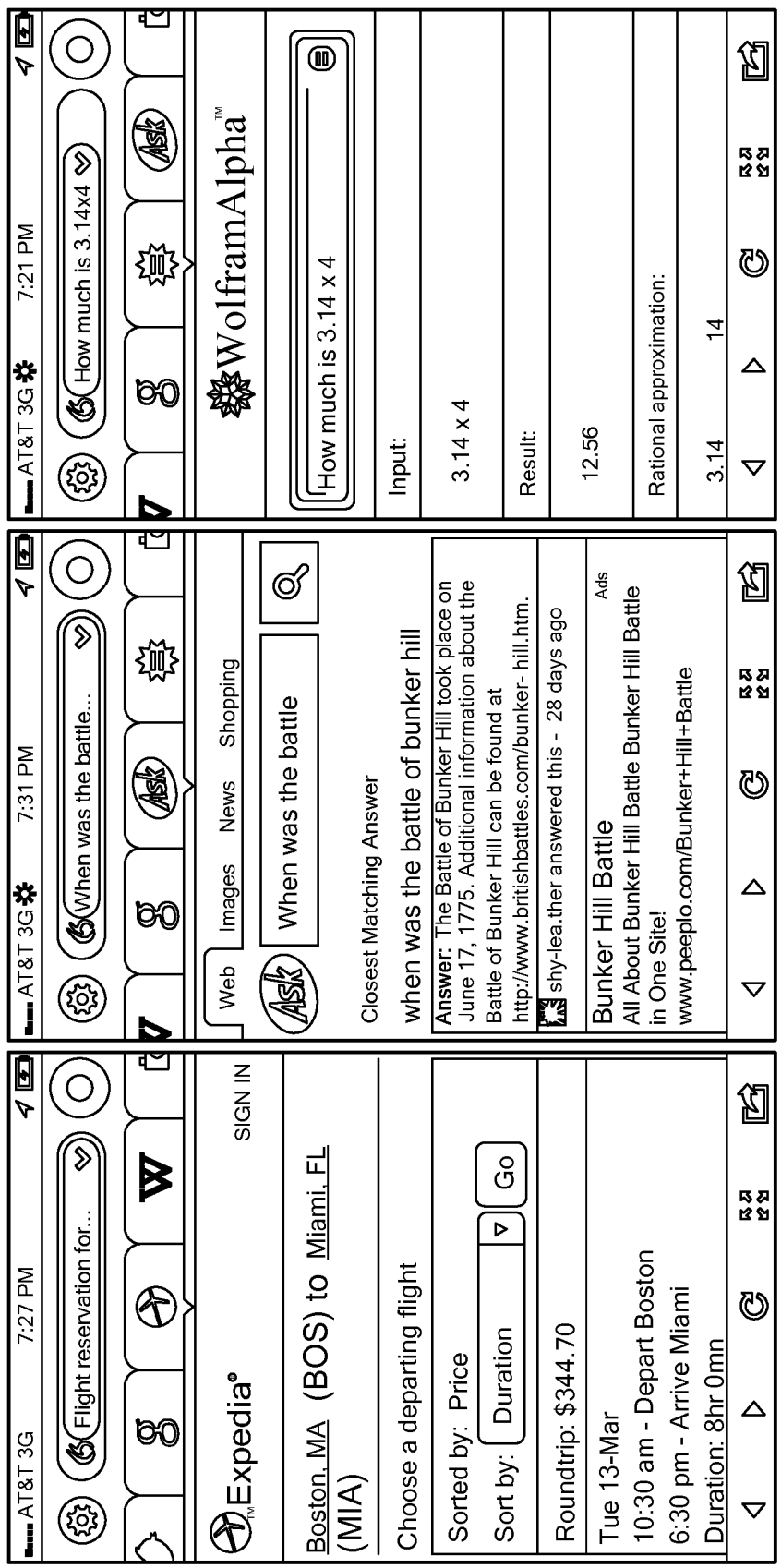
FIG. 1 shows some example screen shots of a natural language query application for a mobile device.
Figure 2:
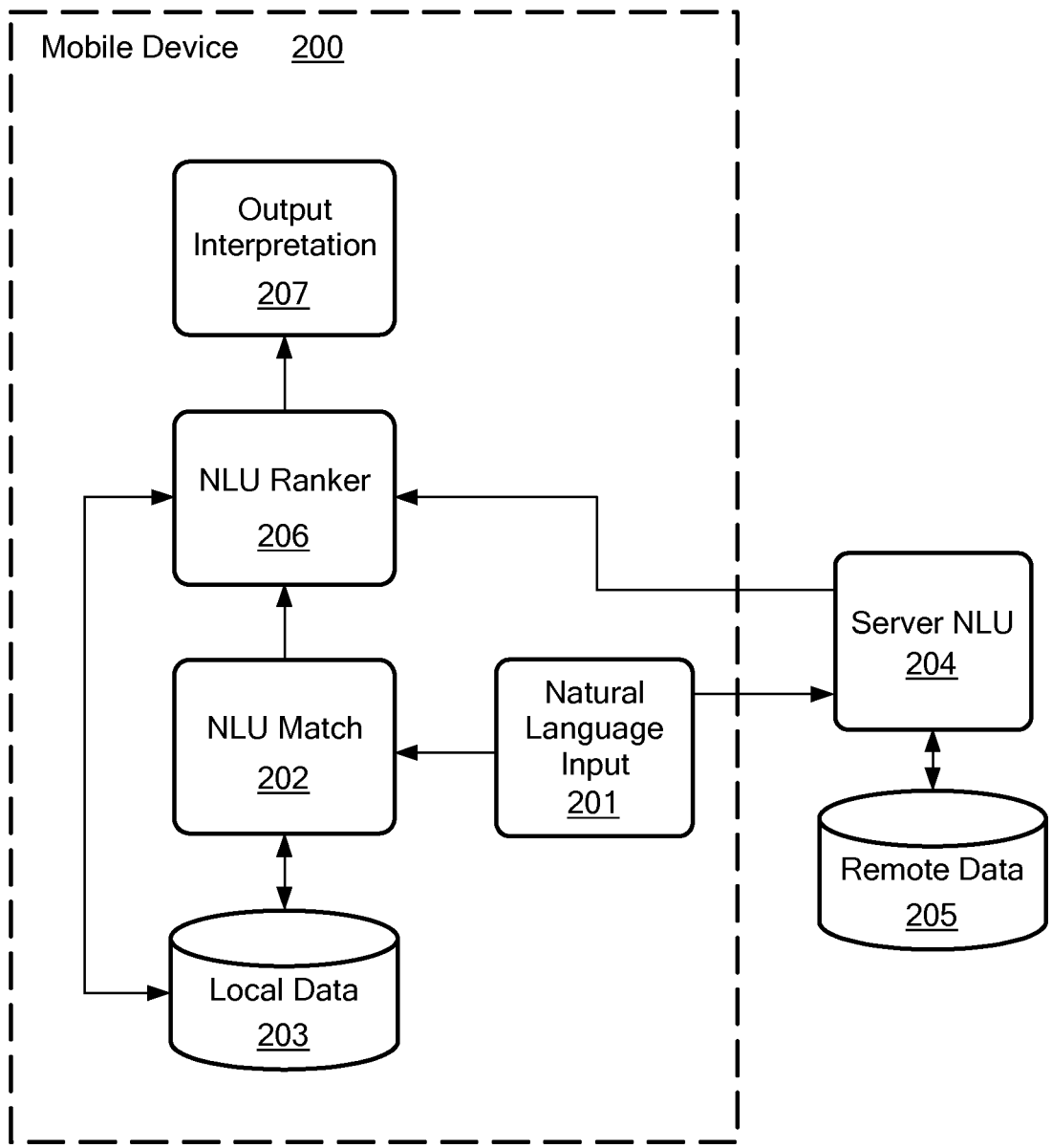
FIG. 2 shows an example of a distributed natural language processing arrangement according to an embodiment of the present invention.
Figure 3:
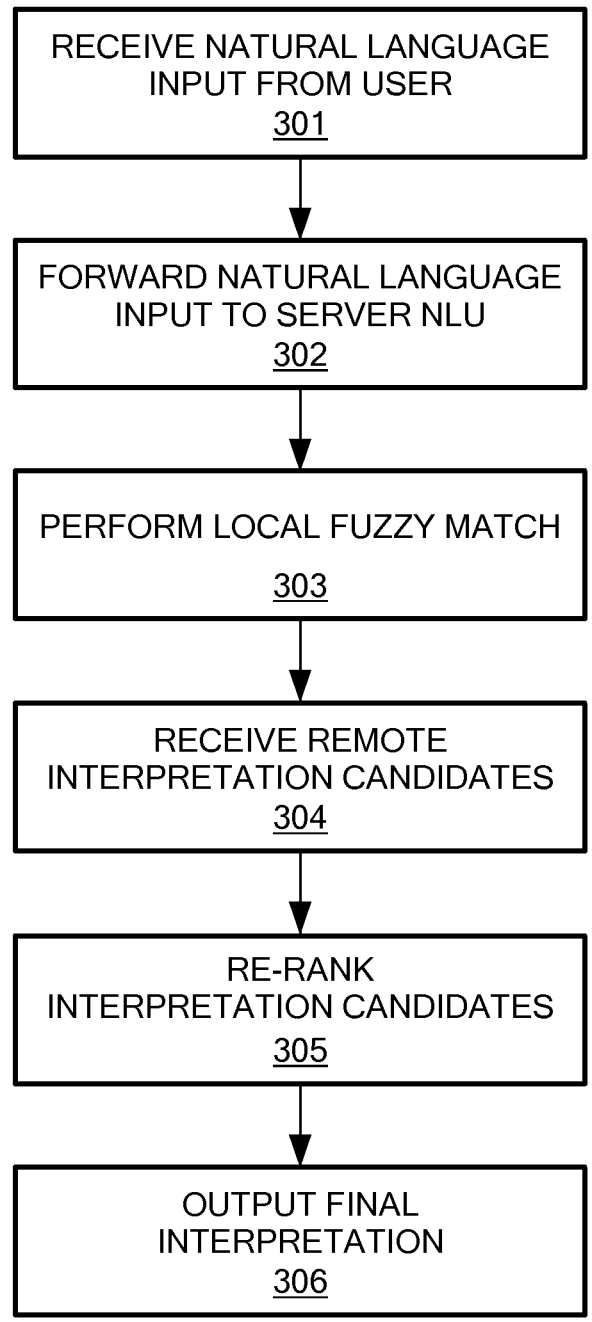
FIG. 3 is a flowchart showing various functional steps in distributed natural language processing according to an embodiment of the present invention.

FIG. 2 shows an example of a distributed natural language processing arrangement and FIG. 3 is a flowchart showing various functional steps in distributed natural language processing according to an embodiment of the present invention. And an example query of "call bob" can be used to explain further, and for purposes of this discussion, assume that a recent movie now in theaters is titled "call bob".

A mobile device 200 receives a natural language input 201 from the user, step 301. The mobile device 200 forwards the natural language input 201 to a remote NLU server 204, step 302, which performs NLU processing of the input using available remote data resources 205 to determine one or more remote interpretation candidates. A relatively lightweight natural language understanding (NLU) match module 202 on the mobile device 200 also performs local NLU processing of the input with respect to local data sources 203 to determine one or more local interpretation candidates, for example, using a fuzzy match algorithm, step 303. The local data sources 203 may typically include without limitation music lists, email contents, meeting contents, contact lists, etc. all local to the device. In some embodiments, some or all of the results of the local NLU processing by the NLU match module 202 (e.g., mention detection results, semantic attachment extraction, query intents, and/or semantic classification results) may also be forwarded to the remote NLU server 204, which can use that information to augment its own interpretations.

A local NLU ranking module 206 on the mobile device 200 receives the remote interpretation candidates from the remote NLU server 204, step 304, and processes them together with the local interpretation candidates from the NLU match module 202 to re-rank the combined interpretation candidates into a combined N-Best list, step 305, and determine a final output interpretation 207 corresponding to the natural language input 201, step 306. In some embodiments, the remote NLU server 204 may do some or all of the candidate ranking itself, and provide the ranking results with the remote interpretation candidates sent back to the mobile device 200.

In such arrangement, it may be useful to constrain the server NLU 204 to not prune interpretation candidates that might have survived if it had access to some of the local data 203 on the mobile device 200. That is, the N-Best list of remote interpretation candidates needs to be not pruned under such circumstances. The server NLU 204 can be trained based on NLU training data for music, meetings, contact info, etc. that has been associated with example queries, running each such sample query through the server NLU 204 to take the top result. Then the training of the server NLU 204 can be repeated on the same training data minus the music, meeting, contact info, etc. data likely to be on a local mobile device 200, and each query re-run through the server NLU 204 and take the top result. This produces training data along with NLU output—abstract features can be constructed from the NLU output. And for each training query sample, if the top NLU result of the server NLU 204 changed with the presence of the pseudo-local data, the trained server NLU 204 now can identify, for each query, on the server-side if that query would be susceptible to being altered if local data 203 on the local mobile device 200 was available. During run-time operation if the server NLU 204 identifies that a given interpretation candidate is susceptible from being affected by local data 203, then that interpretation candidate is flagged when it is sent to the NLU ranker 206 (along with other useful local processing information that may be available) for further local processing on the mobile device 200. One effect of such an arrangement is a longer N-Best list of remote interpretation candidates from the server NLU 204 to the local NLU ranker 206, and no sensitive or band-width consuming information is sent from the mobile device 200 to the server NLU 204.

To return to the example query of "call bob", the mobile device 200 sends this natural language input 201 to the server NLU 204 which NLU processes it to produce one or more remote interpretation candidates, and also identifies that this query should be further processed and re-ranked on the mobile device 200. The remote interpretation candidates from the server NLU 204 would be:

1. "[Movie] call bob [/Movie]": Movie
2. "call [Person] bob [/Person]": Call-Contact These are sent to the mobile device 200 (possibly with other useful information). The NLU module 202 does fuzzy match on the movie and contact DBs present in the local data 203. If a movie "call bob" is present in the local data 203, the interpretation candidates are not re-ordered. That is unlikely in this hypothetical scenario where we assumed that the movie just recently came out. If there is a contact called "Bob Smith", then the NLU Ranker 206 does re-sort the interpretation candidates so that Call-Contact now is on top as the output interpretation 207.

Embodiments of the invention may be implemented in whole or in part in any conventional computer programming language such as VHDL, SystemC, Verilog, ASM, etc. Alternative embodiments of the invention may be implemented as pre-programmed hardware elements, other related components, or as a combination of hardware and software components.

Embodiments can be implemented in whole or in part as a computer program product for use with a computer system. Such implementation may include a series of computer instructions fixed either on a tangible medium, such as a computer readable medium (e.g., a diskette, CD-ROM, ROM, or fixed disk) or transmittable to a computer system, via a modem or other interface device, such as a communications adapter connected to a network over a medium. The medium may be either a tangible medium (e.g., optical or analog communications lines) or a medium implemented with wireless techniques (e.g., microwave, infrared or other transmission techniques). The series of computer instructions embodies all or part of the functionality previously described herein with respect to the system. Those skilled in the art should appreciate that such computer instructions can be written in a number of programming languages for use with many computer architectures or operating systems. Furthermore, such instructions may be stored in any memory device, such as semiconductor, magnetic, optical or other memory devices, and may be transmitted using any communications technology, such as optical, infrared, microwave, or other transmission technologies. It is expected that such a computer program product may be distributed as a removable medium with accompanying printed or electronic documentation (e.g., shrink wrapped software), preloaded with a computer system (e.g., on system ROM or fixed disk), or distributed from a server or electronic bulletin board over the network (e.g., the Internet or World Wide Web). Of course, some embodiments of the invention may be implemented as a combination of both software (e.g., a computer program product) and hardware. Still other embodiments of the invention are implemented as entirely hardware, or entirely software (e.g., a computer program product).

Although various exemplary embodiments of the invention have been disclosed, it should be apparent to those skilled in the art that various changes and modifications can be made which will achieve some of the advantages of the invention without departing from the true scope of the invention.

What is claimed is:

1. A method comprising:

configuring a client device to: process one or more natural language inputs with respect to data sources stored on the client device to determine a first set of interpretation candidates for the one or more natural language inputs; and to communicate, to a server, results from processing the one or more natural language inputs with respect to the data sources stored on the client device;

determining, by the server and based on the results from processing the one or more natural language inputs with respect to the data sources stored on the client device, a list of possible interpretation candidates for the one or more natural language inputs, the list comprising a second set of interpretation candidates for the one or more natural language inputs;

ranking, by the server, the list of possible interpretation candidates;

pruning, by the server, the list of possible interpretation candidates;

constraining, by the server and based on pseudo data corresponding to the data sources located on the client device, the pruning to prevent at least one interpretation candidate of the second set of interpretation candidates from being pruned from the list of possible interpretation candidates; and communicating, by the server and to the client device, the second set of interpretation candidates for the one or more natural language inputs, for a final output interpretation of the one or more natural language inputs by the client device that comprises ranking a plurality of interpretation candidates comprising the first set of interpretation candidates and the second set of interpretation candidates.

2. The method of claim 1, wherein the results comprise semantic-classification results from processing the one or more natural language inputs with respect to the data sources stored on the client device.

3. The method of claim 1, wherein the data sources comprise at least one of a music list stored on the client device, email content stored on the client device, meeting content stored on the client device, or a contact list stored on the client device.

4. The method of claim 1, further comprising ranking, by the server, the second set of interpretation candidates.

5. The method of claim 4, further comprising configuring the client device to re-rank the second set of interpretation candidates.

6. The method of claim 1, wherein the client device comprises a mobile device remotely located from the server.

7. A system comprising:
  at least one processor; and
  a memory storing instructions that when executed by the at least one processor cause the system to:
    configure a client device to: process one or more natural language inputs with respect to data sources stored on the client device to determine a first set of interpretation candidates for the one or more natural language inputs; and to communicate, to the system, results from processing the one or more natural language inputs with respect to the data sources stored on the client device;
    determine, based on the results from processing the one or more natural language inputs with respect to the data sources stored on the client device, a list of possible interpretation candidates for the one or more natural language inputs, the list comprising a second set of interpretation candidates for the one or more natural language inputs;
    rank the list of possible interpretation candidates;
    prune the list of possible interpretation candidates;
    constrain, based on pseudo data corresponding to the data sources located on the client device, the pruning to prevent at least one interpretation candidate of the second set of interpretation candidates from being pruned from the list of possible interpretation candidates; and
    communicate, to the client device, the second set of interpretation candidates for the one or more natural language inputs, for a final output interpretation of the one or more natural language inputs by the client device that comprises ranking a plurality of interpretation candidates comprising the first set of interpretation candidates and the second set of interpretation candidates.

8. The system of claim 7, wherein the results comprise semantic-classification results from processing the one or more natural language inputs with respect to the data sources stored on the client device.

9. The system of claim 7, wherein the data sources comprise at least one of a music list stored on the client device, email content stored on the client device, meeting content stored on the client device, or a contact list stored on the client device.

10. The system of claim 7, wherein the instructions, when executed by the at least one processor, further cause the system to rank the second set of interpretation candidates.

11. The system of claim 10, wherein the instructions, when executed by the at least one processor, further cause the system to configure the client device to re-rank the second set of interpretation candidates.

12. The system of claim 11, wherein the client device comprises a mobile device remotely located from the system.

13. One or more non-transitory computer-readable media having instructions stored thereon that when executed by one or more computers cause the one or more computers to:
  configure a client device to: process one or more natural language inputs with respect to data sources stored on the client device to determine a first set of interpretation candidates for the one or more natural language inputs; and to communicate, to the one or more computers, results from processing the one or more natural language inputs with respect to the data sources stored on the client device;
  determine, based on the results from processing the one or more natural language inputs with respect to the data sources stored on the client device, a list of possible interpretation candidates for the one or more natural language inputs, the list comprising a second set of interpretation candidates for the one or more natural language inputs;
  rank the list of possible interpretation candidates;
  prune the list of possible interpretation candidates;
  constrain, based on pseudo data corresponding to the data sources located on the client device, the pruning to prevent at least one interpretation candidate of the second set of interpretation candidates from being pruned from the list of possible interpretation candidates; and
  communicate, to the client device, the second set of interpretation candidates for the one or more natural language inputs, for a final output interpretation of the one or more natural language inputs by the client device that comprises ranking a plurality of interpretation candidates comprising the first set of interpretation candidates and the second set of interpretation candidates.

14. The one or more non-transitory computer-readable media of claim 13, wherein the results comprise semantic-classification results from processing the one or more natural language inputs with respect to the data sources stored on the client device.

15. The one or more non-transitory computer-readable media of claim 13, wherein the data sources comprise at least one of a music list stored on the client device, email content stored on the client device, meeting content stored on the client device, or a contact list stored on the client device.

16. The one or more non-transitory computer-readable media of claim 13, wherein the instructions, when executed by the one or more computers, further cause the one or more computers to rank the second set of interpretation candidates.

17. The one or more non-transitory computer-readable media of claim 16, wherein the instructions, when executed by the one or more computers, cause the one or more computers to configure the client device to re-rank the second set of interpretation candidates.

18. The one or more non-transitory computer-readable media of claim 13, wherein the client device comprises a mobile device remotely located from the one or more computers.

* * * * *